Feb. 7, 1967     P. W. EMLEY ET AL     3,303,269
INSULATING SUPPORT MEANS FOR BUS BARS
Filed July 21, 1965     2 Sheets-Sheet 1
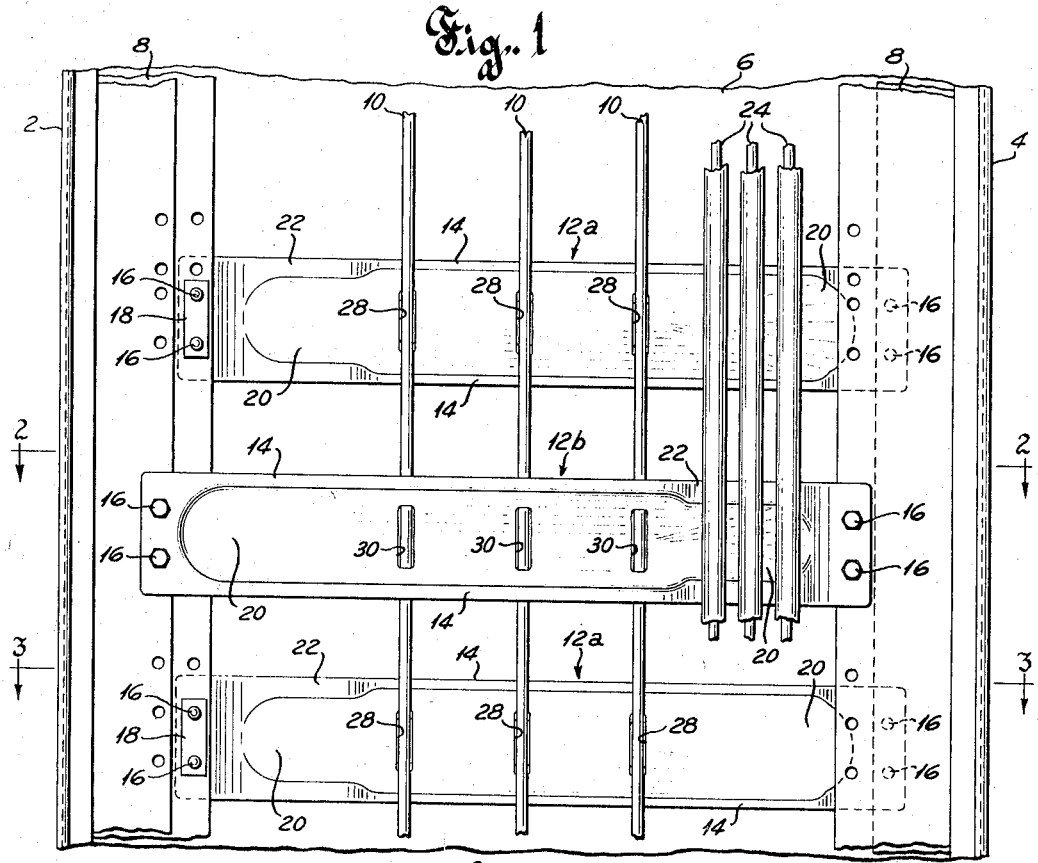
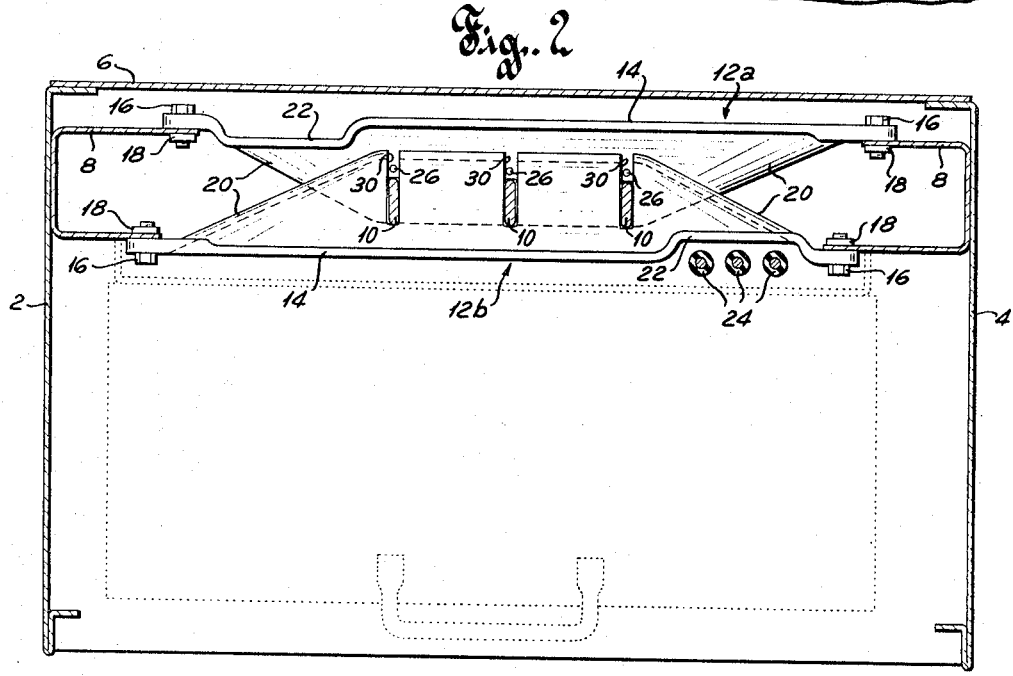

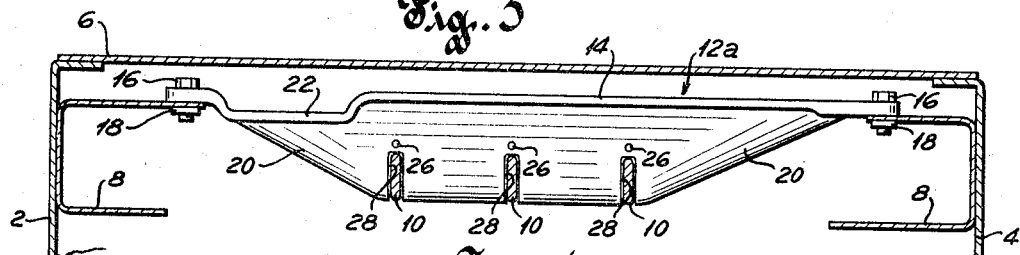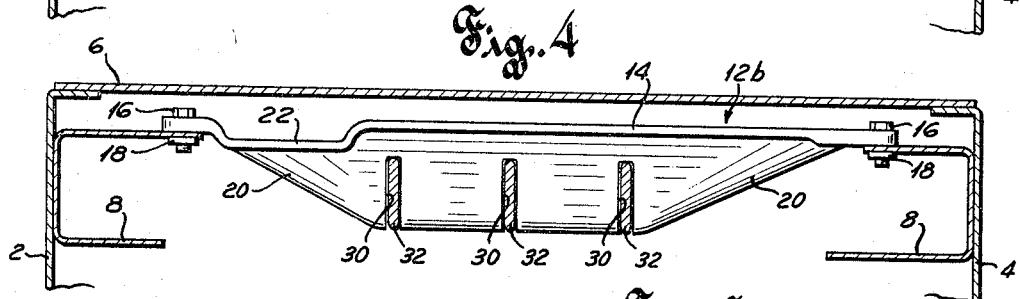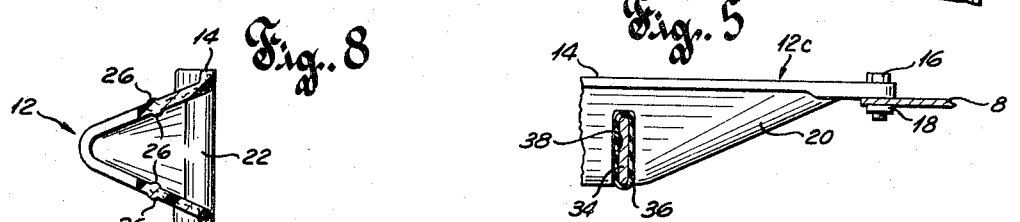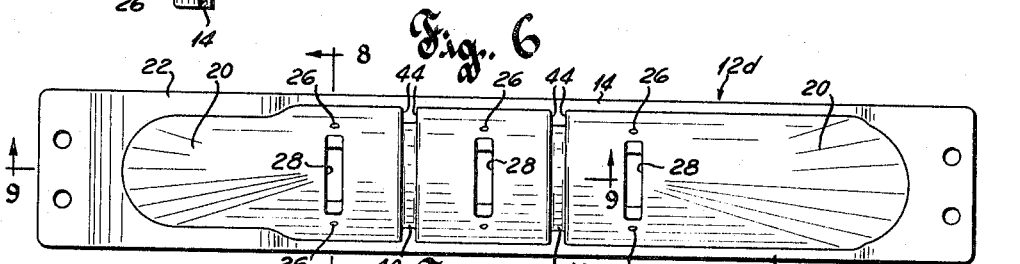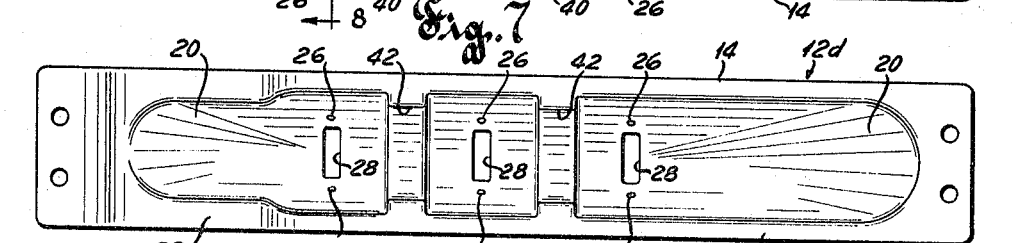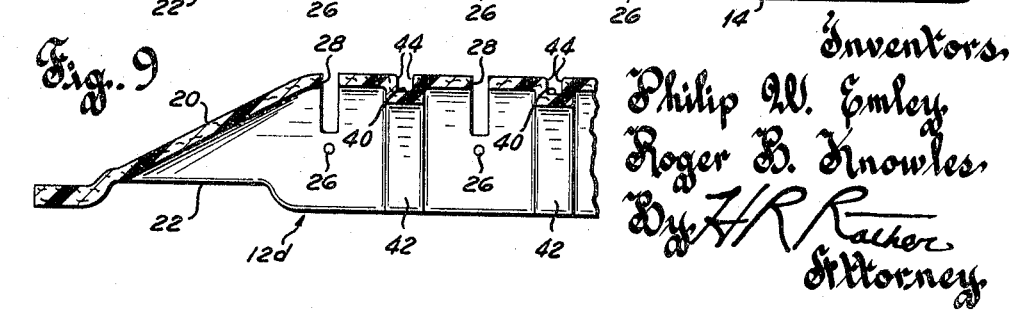

United States Patent Office 3,303,269
Patented Feb. 7, 1967

3,303,269
INSULATING SUPPORT MEANS FOR BUS BARS
Philip W. Emley, Milwaukee, Wis., and Roger B. Knowles, Amsterdam, N.Y., assignors to Cutler-Hammer, Inc., Milwaukee, Wis., a corporation of Delaware
Filed July 21, 1965, Ser. No. 473,742
10 Claims. (Cl. 174—99)

This invention relates to supports for bus bars and more particularly to horizontal supports for vertical bus bars found in motor control center cabinets.

It is an object of this invention to provide a support which is of one piece construction and made entirely of an electrical insulating material.

It is a further object of this invention to provide a support having primarily sloped and vertical surfaces to minimize build-up of foreign material thereon.

It is still another object of this invention to provide a common support having slight modifications to fit numerous installation requirements, thereby reducing manufacturing costs.

These and other objects will become more apparent in the following specification and claims, when read in conjunction with the accompanying drawings, wherein:

FIGURE 1 is a front view of a portion of a motor control center cabinet with the door removed and incorporating the invention;

FIG. 2 is a sectional view taken along line 2—2 of FIG. 1 with a motor control unit dotted in position;

FIG. 3 is a sectional view taken along line 3—3 of FIG. 1;

FIG. 4 is a sectional view similar to FIG. 3 incorporating an alternate type of bus bar;

FIG. 5 is a fragmentary sectional view similar to FIG. 3 and incorporating another alternate type of bus bar;

FIG. 6 is a front view of a modified version of the invention;

FIG. 7 is a rear view of the member shown in FIG. 6;

FIG. 8 is a cross sectional view taken along line 8—8 in FIG. 6 and typical of both versions of the invention; and FIG. 9 is a sectional view taken along line 9—9 of FIG. 6.

Motor control centers of the type depicted herein generally comprise a number of vertical cabinet sections each having a plurality of hinged doors which open to one side. Provisions are made to mount the cabinet sections in a back-to-back or side-by-side arrangement, or a combination of both. Reference may be had to J. L. Defandorf et al. Patent No. 3,140,426, assigned to the assignee of this invention, for a more detailed description of the motor control cabinets as used herein and the previous method of providing horizontal support for the vertical bus bars therein.

With reference particularly to FIGS. 1 and 2 of the drawings there is shown a portion of one vertical cabinet section with its door removed. The cabinet comprises side frame members 2 and 4 and the particular cabinet shown has a closed back portion formed by securing a back plate 6 to the side frame members. It is to be understood that in certain instances the side frame members and back plate may extend further rearward than is shown, and that back plate 6 may be left off completely and another cabinet section secured to the one shown in back-to-back relation. Secured to the side surfaces of the side frames 2 and 4 are vertical mounting channels 8 which are provided with a plurality of pairs of holes along their legs.

In most instances a number of such cabinet sections are mounted together in a side-by-side arrangement and openings are provided in the side frames to allow infeed bus bars to extend horizontally between all the cabinets. Each cabinet is then provided with vertical bus bars 10 which are mounted to the main horizontal bus bars for vertical support and to distribute electrical power to the various motor control units mounted therein, one of which is shown in dotted lines in FIG. 2 to indicate its position relative to the cabinet structure. These units are commonly of the plug-in type which connect to the vertical bus bars 10 by stab-on type terminals, and for this reason the front edges of the bus bars 10 are held at a constant distance from the front edges of the cabinet.

The bus bars 10 extend over the entire height of the cabinet and therefore must be provided with some means of horizontal support. This supporting means must be of insulating material, at least in the area of contact with the bus bars, and must have sufficient strength to resist the high expansive or contractive forces between the bus bars resulting from unusually heavy currents or the like. Modern production and service trends have also dictated that these supporting means be simple to manufacture, easy to install and remove, and be designed to reduce the build-up of electrical conducting foreign material such as dust and moisture on the supporting surfaces.

A support incorporating these requirements is indicated in the drawings generally as reference character 12, although the subscripts a, b, c and d have been added to indicate particular ones having individual differences that will be brought out more clearly hereafter. Support 12 is of a polyester glass mat laminate construction having a V-shaped cross section, shown best in FIG. 8, with an outwardly extending circumferential rib portion 14 formed for additional strength. The thickness of the rib 14 is increased at each end of the support and a pair of holes is provided in each end for mounting the support 12 to the vertical mounting channels 8 by bolts 16 which pass through the corresponding holes in the support and the channels and take into threaded openings in straps 18.

The support 12 has end portions 20 which have a general shape of one-half of an oblique cone with its apex extending to the apex of the V-shaped cross section of the support and the side walls of which converge tangentially with those of the cross sectional V. The apexes have been rounded to blend together smoothly.

An offset portion 22 is provided at one end of support 12 to provide clearance for additional wiring required in some instances between the panel of the plug-in unit and the supports as indicated by wires 24. A plurality of raised nibs 26 are formed on the front and rear surfaces of the support as seen best in FIGS. 3 and 8 for identification purposes that will become more apparent later.

The support, insofar as described to this point, comprises a rigid blank from which various supports can be made for particular installation locations by cutting slots into the blank for the bus bars. These slots may vary in width and depth according to the particular installation requirements and location. The supports 12a shown at the top and bottom of FIG. 1 and in FIG. 3 have slots 28 cut into the apex. These slots are of a width slightly greater than the narrow dimension of the cross section of the bus bars 10 and of a depth sufficient to encompass the long dimension of the cross section of the bus bars 10 which in FIGS. 1–3 are the 1″ type. Support 12b shown in the middle of FIG. 1, and in FIGS. 2 and 4, has slots 30 cut into the apex. Slots 30 are of the same width as slots 28, but as shown in FIG. 4, are of greater depth than slots 28 to encompass the long dimension of bus bars 32 which are of the 1½″ type. In comparing supports 12a and 12b it can be seen that the identifying nibs 26 remain on support 12a and lie just below the slots 28, while the nibs have been lost in cutting the deeper slots 30 in support 12b. This provides a ready indication of a single support without having a second support of the opposite type to compare.

The unit shown in FIGS. 1–3 uses 1″ bus bars 10 as mentioned before, and requires that the rear mounted supports be those with the shallower slots, namely, 12a, while the front mounted supports be those with the deeper slots, namely 12b. FIG. 4 shows a fragmentary cross sectional view of the same cabinet using 1½″ bus bars 32. As mentioned before, the front edge of the bus bars is held a constant distance from the front of the cabinet, and for this reason the 1½″ bars extend further to the rear of the device. Thus the supports 12b with the deeper slots 30 are used in both the front and the rear of this version.

FIG. 5 shows another version of bus bar, this being a 1½″ insulated bus bar 34. Bus bar 34 is in the same location with respect to the control unit as bar 32, however, bar 34 has an insulating covering 36 and therefore slots 38 cut into the support 12c must compensate for this. Thus the slots 38 are wider than slots 28 and 30 by twice the thickness of the insulating covering 36 and are deeper in this instance than slots 30 by the thickness of the covering 36. The identifying nibs 26 would also appear on a support for a 1″ insulated bus bar as they do on support 12a. An additional means of identification may be used for supports with the wider slots for insulated bus bars such as coloring the tip of one end of the support.

The support as presented represents a simple one piece design which has sloped surfaces in the areas of the bus bars to deter moisture, dust or other foreign material from accumulating which could create an arc path between the bus bars. The V-shaped cross section, coupled with the oblique cone-shaped ends 20 and circumferential rib 14 provides a strong support capable of withstanding great sideways thrust of the bus bars due to unusually heavy current. The support has slots opening to one side to allow it to be easily mounted and removed, and the use of front and rear mounted supports rigidly secures the bus bars against movement in these directions. The material, manufacturing process, and common blank for numerous types of supports reduces both the cost of the support and the number of items to be stocked.

A modified version of the support is shown in FIGS. 6, 7 and 9. The same basic support 12 is shown with one method of producing arc barriers to increase the arc creepage distance. This support, labeled 12d, has depressions 40 formed in its front surface concurrent with the V-shaped side walls. The rear surfaces of support 12d have raised portions 42 in these areas to provide uniform wall thickness around the depressions as seen in FIG. 9. Depressions 40 have vertical side walls 44 which provide the additional protection against build-up of foreign materials. The particular support 12d shown in FIGS. 6–9 has the narrow, shallow slots 28 with the identifying nibs 26 as did support 12a.

We claim:

1. An insulating support member providing lateral support for a plurality of bus bars, said support comprising:
   a pair of angled surfaces extending transversely of said bus bars, said surfaces being joined together along one edge thereof to have a V-shaped cross section and having the ends thereof enclosed by outwardly extending oblique conical portions, the apexes of said conical portions being joined to the apex of said angled surfaces and the surfaces of said conical portions formed tangential to said angled surfaces, said apexes being rounded to blend together smoothly, and
   a plurality of slots laterally spaced along said V-shaped angled surfaces, said slots being open to the apex side thereof to receive said bus bars therein.

2. The combination according to claim 1, together with a circumferential rib extending outwardly from the bases of said conical portions and the legs of said V-shaped angled surfaces, and means provided at the ends of said support for mounting said support directly to a cabinet structure housing said bus bars.

3. Support means to provide lateral insulating support for a plurality of parallel bus bars, said means comprising, in combination, a mounting structure housing said bus bars and a plurality of insulating support members secured thereto, said insulating support members each comprising a pair of angled surfaces joined along one edge thereof and having the ends thereof enclosed by outwardly extending oblique conical portions, said conical portions being formed tangential to said angled surfaces with the apexes thereof joined to the apex of said angled surfaces, said apexes being rounded to blend together smoothly, and a plurality of slots laterally spaced along said V-shaped angled surfaces, said slots being open to the apex side thereof to receive said bus bars therein, said insulating support members further being secured to said mounting structure to extend transversely to said bus bars at spaced intervals along their length, said supports being alternately disposed on opposite sides of said bus bars with the apex sides thereof facing the bus bars to receive the latter within said slots.

4. The combination according to claim 3 wherein the slots of said supports on one side of said bus bars are of a shallower depth than the slots of those supports mounted on the opposite side of said bus bars, and wherein said supports having the shallower slots are provided with identifying means on said angled surfaces alined with said slots and disposed just below the bottom of said slots.

5. The combination according to claim 4, wherein said identifying means is disposed on both sides of said each leg of said V-shaped angled surfaces.

6. The combination according to claim 2, together with identifying means on said angled surfaces alined with said slots and disposed just below the bottom of said slots to identify the depth of said slots therein.

7. The combination according to claim 6, wherein said identifying means is disposed on both sides of said each leg of said V-shaped angled surfaces.

8. The combination according to claim 2, together with a depressed portion formed on the outer side of said V-shaped angled surfaces between each pair of slots concurrent with said angled surfaces, and a raised portion formed on the inner side of said V-shaped angled surfaces concurrent with said angled surfaces and in line with said depressed portions.

9. The combination according to claim 8, together with a portion offset inwardly toward said apex from the base side of said V-shaped angled surfaces.

10. The combination according to claim 9, wherein said support is formed of a glass mat laminate construction.

References Cited by the Examiner

UNITED STATES PATENTS

| 1,008,087 | 11/1911 | Sweeney | 174—174 X |
| 2,306,353 | 12/1942 | Cole et al. | 174—99 X |
| 3,042,890 | 7/1962 | Gamble et al. | 174—99 X |
| 3,113,820 | 12/1963 | Norden | 174—68 X |

FOREIGN PATENTS

| 11,032 | 1892 | Great Britain. |

LARAMIE E. ASKIN, *Primary Examiner.*